(12) United States Patent
Huerta et al.

(10) Patent No.: US 7,233,928 B2
(45) Date of Patent: Jun. 19, 2007

(54) RULE-BASED SYSTEM FOR DETERMINING PRICE ADJUSTMENTS IN A PRODUCT CATALOG

(75) Inventors: Anamarie E. Huerta, Palo Alto, CA (US); Anoop Singhal, Santa Clara, CA (US); James Louis Keesey, Sunnyvale, CA (US); Sri Raghupathy, San Jose, CA (US); Narayanan Vijaykumar, Cupertino, CA (US)

(73) Assignee: Vendavo, Inc., Palo Alto, CA (US)

( * ) Notice: Subject to any disclaimer, the term of this patent is extended or adjusted under 35 U.S.C. 154(b) by 1025 days.

(21) Appl. No.: 10/121,803

(22) Filed: Apr. 12, 2002

(65) Prior Publication Data

US 2003/0200185 A1 Oct. 23, 2003

(51) Int. Cl.
  *G06Q 99/00* (2006.01)
(52) U.S. Cl. .............. 705/400; 705/1; 705/20; 705/26; 705/80
(58) Field of Classification Search .............. 705/1, 705/20, 26, 80, 400
  See application file for complete search history.

(56) References Cited

U.S. PATENT DOCUMENTS

| 3,806,711 | A | 4/1974 | Cousins, Jr. ............. 235/151.3 |
| 5,053,957 | A | 10/1991 | Suzuki ........................ 364/405 |
| 5,224,034 | A | 6/1993 | Katz et al. ................... 364/401 |
| 5,461,708 | A | 10/1995 | Kahn ........................... 345/440 |
| 5,670,984 | A | 9/1997 | Robertson et al. ........... 345/427 |
| 5,689,287 | A | 11/1997 | Mackinlay et al. .......... 345/427 |
| 5,740,448 | A | 4/1998 | Gentry et al. ................ 710/200 |

(Continued)

FOREIGN PATENT DOCUMENTS

WO  WO 99/60486  11/1999  .................. 705/14

(Continued)

OTHER PUBLICATIONS

"Net Commerce launches Its FastTrack Configurator and FasPac Catalog Utility", Apr. 17, 2001, Business Wire. New York. p. 1.*

(Continued)

*Primary Examiner*—John W. Hayes
*Assistant Examiner*—Freda A Nelson
(74) *Attorney, Agent, or Firm*—Kang Lim

(57) ABSTRACT

A method for computing a price quote for a product using a contract. The method includes identifying the set of price rules for a plurality of products associated with the contract. Each price rule in the set of price rules is either a hard price rule or a soft price rule. Each hard price rule includes a price rule expression and a price rule type and each soft price rule comprises a price rule type. A collection of price rules is generated including, for each soft rule in the set of price rules, hard price rules that are associated with the product and that have the same price rule type as the soft price rule. Hard price rules that are associated with the contract are also added to the collection of price rules. A pricing scheme that is to be used in order to determine the price quote for the product is selected and used to resolve the hard price rules in the collection of price rules in order to determine the price quote.

37 Claims, 8 Drawing Sheets

U.S. PATENT DOCUMENTS

| | | | |
|---|---|---|---|
| 5,878,400 A | 3/1999 | Carter, III | 705/20 |
| 6,320,586 B1 | 11/2001 | Plattner et al. | 715/700 |
| 6,812,926 B1 | 11/2004 | Rugge | 345/440.2 |
| 2002/0032610 A1* | 3/2002 | Gold et al. | 705/20 |
| 2002/0042782 A1* | 4/2002 | Albazz et al. | 705/80 |
| 2002/0156695 A1* | 10/2002 | Edwards | 705/26 |

FOREIGN PATENT DOCUMENTS

| | | | |
|---|---|---|---|
| WO | WO 00/29995 | * | 5/2000 |

OTHER PUBLICATIONS

"SPEX Assesses B2C and B2B Electronic Commerce Software Maturity", PR Newswire, New. New York: p. 1.*

Origin 7.0 Help (including 21 sheets of screen shots), 2000.

Microsoft Excel 2000, 1985-1999.

Marn, Michael V. and Robert L. Rosiello, "Managing Price, Gaining Profit," Harvard Business Review, pp. 84-93 (Sep.-Oct. 1992).

* cited by examiner

| | |
|---|---|
| Pricing scheme 1 | ~70-1 |
|    Resolution principle 1 | ~302-1-1 |
|    Resolution principle 2 | ~302-1-2 |
|    ⋮ | |
| ⋮ | |
| Pricing scheme P | ~70-1 |
|    Resolution principle 1 | ~302-P-1 |
|    Resolution principle 2 | ~302-P-2 |
|    ⋮ | |
| Contract 1 | ~80-1 |
|    Customer | ~304-1 |
|    Time period | ~306-1 |
|    Price rule set | ~308-1 |
|       Hard price rule 1 | ~310-1-1 |
|       ⋮ | |
|       Soft price rule 1 | ~312-1-1 |
|       ⋮ | |
|    Product scope designation | ~314-1 |
|    Pricing scheme designation | ~316-1 |
| ⋮ | |
| Contract Q | ~80-Q |
|    Customer | ~304-Q |
|    Time period | ~306-Q |
|    Price rule set | ~308-Q |
|       Hard price rule 1 | ~310-Q-1 |
|       ⋮ | |
|       Soft price rule 1 | ~312-Q-1 |
|       ⋮ | |
|    Product scope designation | ~314-Q |
|    Pricing scheme designation | ~316-Q |

FIG. 3

RULE-BASED SYSTEM FOR DETERMINING PRICE ADJUSTMENTS IN A PRODUCT CATALOG

The present invention relates generally to a method of pricing products using contracts and pricing schemes.

RELATED APPLICATIONS

This application is related to SYSTEM AND METHOD FOR GROUPING PRODUCTS IN A CATALOG filed on even date herewith, Ser. No. 10/121,816.

BACKGROUND OF THE INVENTION

For many business enterprises, the process of providing accurate price quotes is complex because the price quotes are dependent upon many variables. Some of these variables include the quantity of a product requested, the type of product requested, the class of the customer who is requesting the product, inventory levels for the requested product, as well as applicable discounts that apply to the requested product. Resolving each of these variables in order to provide an accurate quote in real time is a complex task. Often, the ability to provide such an accurate quote provides a competitive business advantage.

One of the more difficult tasks in providing a real time price quote for a product is the determination of which price rules apply to the product. Another difficult task in providing a real time price quote is determining how the various price rules that apply to a given product interact with each other. For example, consider the case in which there are two price rules that apply to a given product, the first price rule specifying 10 percent off the list price and the second price rule specifying five dollars off the list price. Which of these rules should be applied, and in which order? Should the first price rule be applied to the list price, and then the second price rule be applied to the result of applying the first rule (i.e. take 10 percent off the price and then apply a five dollar discount)? Or should the second price rule and then the first price rule be applied to the list price (i.e. take five dollars off the price and then apply a 10 percent discount)? Or, alternatively, should the first price rule be ignored when the second price rule applies the product? This example illustrates the complexity that arises when just a few price rules apply to a given product. This complexity increases when multiple products, vendors and additional variables are taken into consideration.

Often, price rules are negotiated on a customer-by-customer basis, for fixed periods of time, and/or for fixed sets of products. For example, pharmaceutical company "A" may negotiate a 10 percent discount for all products sold by chemical company "B." Furthermore, pharmaceutical company "A" may negotiate an additional 5 percent discount for a specific product, such as bulk sodium chloride, that is to be purchased from chemical company "B." Each of the negotiated discounts may cover designated time periods. Furthermore, individual divisions within pharmaceutical company "A" may negotiate discounts or other forms of pricing arrangements with chemical company "B." Thus, for a single vendor/customer relationship, there may be multiple pricing agreements covering overlapping time periods, products, and divisions within the customer business organization. A salesperson working for chemical company "B" must attempt to resolve each of these pricing agreements in order to determine a price quote for an order placed by pharmaceutical company "A." Added to this problem is the fact that chemical company "B" has many other customers, each with a set of negotiated pricing agreements.

Price rules that determine the price of products may arise from sources independent of the price rules generated by the negotiation of price agreements between vendors and customers. Salespeople may be given the flexibility to apply discounts. In fact, this privilege may be tiered based on the experience level of the salesperson. The vendor may apply special discounts to stock items that are about to become obsolete or are overstocked. The vendor may attach specific price rules to individual products offered by the vendor. For instance, the vendor may tier the list price of an individual product based on the amount of product ordered. If chemical company "B" sells the chemical trifluoroethanol, for example, it may set a first price if the customer buys one gram of the chemical, a second lower price if the customer buys ten grams of the chemical, and a bulk price if the customer buys 100 grams or more of the chemical. Furthermore, a vendor may tier the price of a product based on the geographical region in which the product is sold in order to increase market share in a specific region or satisfy some other marketing goal.

In yet another layer of complexity, there are many situations in which a salesperson may represent multiple vendors. Each vendor may offer a range of price agreements. Some of these price agreements may be customer-specific, region-specific, or applicable for specific time periods. In such situations, the salesperson must perform a series of analyses in order to obtain the most favorable price quote for the specific customer.

Each product in any given price quote may have a large number of applicable price rules that are each designed to set and/or adjust the price of the product. Often, for a given product, the way the applicable price rules are combined in order to determine a price quote for the product is important.

Prior art electronic pricing systems do not provide satisfactory methods for tracking and resolving the complex array of price rules that are associated with products and services sold by business enterprises. Given the above background, what is need in the art is a systematic method for (i) tracking each of the price agreements negotiated between vendors and customers, (ii) tracking the price rules that applicable to each product in a product catalogue, and (iii) resolving multiple applicable price rules that may apply to each product specified in a product quote.

SUMMARY OF THE INVENTION

In summary, the present invention provides a systematic method for defining and tracking vendor/customer price agreements, tracking price rules that applicable to each product in a product catalogue, and resolving multiple applicable price rules that apply to each product specified in a product quote.

A first aspect of the invention provides a method for computing a price quote for a product using a contract. A set of price rules for a plurality of products is associated with the contract. The product for which a quote is requested is a member of the plurality of products associated with the contract. In the method, the set of price rules for the plurality of products associated with the contract is identified. Each price rule in the set of price rules is either a hard price rule or a soft price rule. Each hard price rule comprises a price rule expression and a price rule type. Each soft price rule comprises a price rule type. Next, a collection of price rules is generated. The collection of price rules includes, for each soft rule in the set of price rules, hard price rules that are associated with the product and that have the same price rule type as the soft price rule. The collection of price rules also includes the hard price rules in the set of price rules that are associated with the product. A pricing scheme is chosen. The pricing scheme is used to resolve the hard price rules in the collection of price rules, thereby determining the price quote for the product.

In one embodiment of the present invention, the pricing scheme that is used to resolve the hard price rules in the collection of price rules is a pricing scheme that is associated with the contract. In another embodiment of the invention, the pricing scheme is a global (i.e. default) pricing scheme that is used when no pricing scheme is explicitly associated with the contract.

A second aspect of the present invention provides a method of preparing a price quote for a product that is selected from among a plurality of products. In the method, a pricing scheme that includes one or more resolution principles is identified. Then, an initial set of price rules is processed in accordance with the one or more resolution principles of the identified pricing scheme to yield a final set of applicable price rules. Each price rule in the final set of price rules includes a price rule type that includes a price rule type identifier. The final set of price rules is used to determine the price quote for the product.

In some embodiments of the present invention, the pricing scheme includes resolution principles that are inheritance principles, assertion principles, connection principles, and/or arbitration principles. In another embodiment, the initial set of price rules is gathered from each object in a plurality of objects to which the product belongs. Each object is either one or more price rules uniquely associated with the product, a contract, a product category, or a product collection. A product category is a set of products that is selected from among the plurality of products offered by the vendor based on a predetermined selection rule. A product collection is a set of products that is selected from among the plurality of products offered by the vendor based on a dynamic selection rule set.

In some embodiments in which a resolution principle in the applicable pricing scheme is an inheritance principle, the inheritance principle is used to process a first and second price rule in the initial set of price rules. In such embodiments, all applicable price rules are added to the initial set of price rules. Then, the processing step filters a first price rule and a second price rule in the initial set of price rules in accordance with the inheritance principle so that the final set of price rules excludes either the first price rule or the second price rule. In other embodiments in which a resolution principle in the applicable pricing scheme is an inheritance principle, the inheritance principle is used to specify an order by which objects are to be queried for price rules. In such embodiments, applicable price rules from the queried object are selectively added to the initial set of price rules.

In some embodiments in which a resolution principle in the applicable pricing scheme is an assertion principle, the assertion principle requires that a first group of price rules be excluded from the final set of price rules when the initial set includes a price rule from a specified second group of price rules. The first and second group may include (i) price rules having a specified price rule type, (ii) price rules uniquely associated with a product offered by the vendor, (iii) price rules associated with a product collection or, product category, and/or (iv) one or more designated price rules.

In some embodiments of the present invention, the processing step includes filtering the initial set of price rules to form an intermediate set of price rules based on application of one or more assertion principles of the pricing scheme. Each of these assertion principles indicates a first group of price rules to exclude from the final set when any price rule of the intermediate group includes a price rule from a second group of price rules. Furthermore, in the filtering step, at least one assertion principle of the pricing scheme is applied to the intermediate set of price rules to generate the final set of price rules.

In some embodiments of the present invention, a resolution principle in the applicable pricing scheme is a connection principle that defines how two or more price rules in the initial set of price rules interact. In such instances, the processing step comprises applying the two or more price rules in a manner specified by the connection principle. In one example, two or more price rules in the initial set of price rules are percentage price adjustments and the connection principle dictates selection of the price rule of the two or more price rules that specifies the largest or smallest percentage price adjustment and excludes the other percentage price adjustment rules from the final set of price rules. In another example, the connection principles dictates summing two or more price rules to form a new price rule that is included in the final set of price rules. In still another example, the connection principle dictates the order in which two or more percentage adjustment price rules in the initial set of price rules are applied to form a new percentage adjustment price rule that is included of the final set of price rules. In yet another example, two or more price rules in the initial set of price rules specify an amount price adjustment and the connection principle dictates selection of a price rule of the plurality of price rules that specifies a largest or smallest amount price adjustment. In this example, all other amount price adjustment price rules in the initial set of price rules that specify amount price adjustments are excluded from the final set of price rules.

In some embodiments of the present invention, connection principles are used to combine percent adjustment price rules with amount adjustment price rules in the initial set of price rules to form a composite price rule that is included in the final set of price rules. Thus, when used in this context, the connection principle defines an interaction between one or more percent adjustment price rules and one or more amount adjustment price rules. This interaction may comprise an operation in which a price rule specifying a largest or smallest absolute amount is selected.

Another aspect of the present invention provides a computer program product for computing a price quote for a product using a contract. The computer program product comprises several instructions, including instructions for identifying the contract that is to be used to compute a price quote for the product. A set of price rules that are applicable to a plurality of products is associated with the contract. The plurality of products may be all or a subset of the products offered by one or more vendors. The product for which a price quote is requested is a member of the plurality of products covered by the contract. The computer program product further comprises instructions for identifying the set of price rules for the plurality of products associated with the contract. Each price rule of this set of price rules is either a hard price rule or a soft price rule. The computer program product also includes instructions for generating a collection of price rules from the set of price rules. This collection of price rules includes, for each soft rule in the set of price rules, hard price rules that are associated with the product and that have the same price rule type as the soft price rule. The collection of price rules also includes the hard price rules in the set of price rules that are associated with the product. Furthermore, the computer program product includes instructions for choosing a pricing scheme to be used in order to determine the price quote for the product and instructions for resolving the hard price rules in the collection of price rules with the pricing scheme in order to determine the price quote for the product.

Another embodiment of the present invention provides a computer program product for determining a price quote for a product. The computer program product comprises several instructions, including instructions for identifying a pricing scheme to be used in order to determine the price quote for the product. The pricing scheme includes one or more resolution principles. The computer program product includes instructions for processing an initial set of price rules in accordance with the one or more resolution principles of the pricing scheme to obtain a final set of applicable price rules. Each price rule in the initial set of price rules includes a price rule type that has a price rule type identifier. The computer program product also includes instructions for using the final set of price rules to determine the price quote for the product.

BRIEF DESCRIPTION OF THE DRAWINGS

Additional objects and features of the invention will be more readily apparent from the following detailed description and appended claims when taken in conjunction with the drawings, in which:

FIG. 3 illustrates the data structure for pricing schemes and contracts, in accordance with one embodiment of the present invention.

DESCRIPTION OF THE PREFERRED EMBODIMENTS

Figure 1:
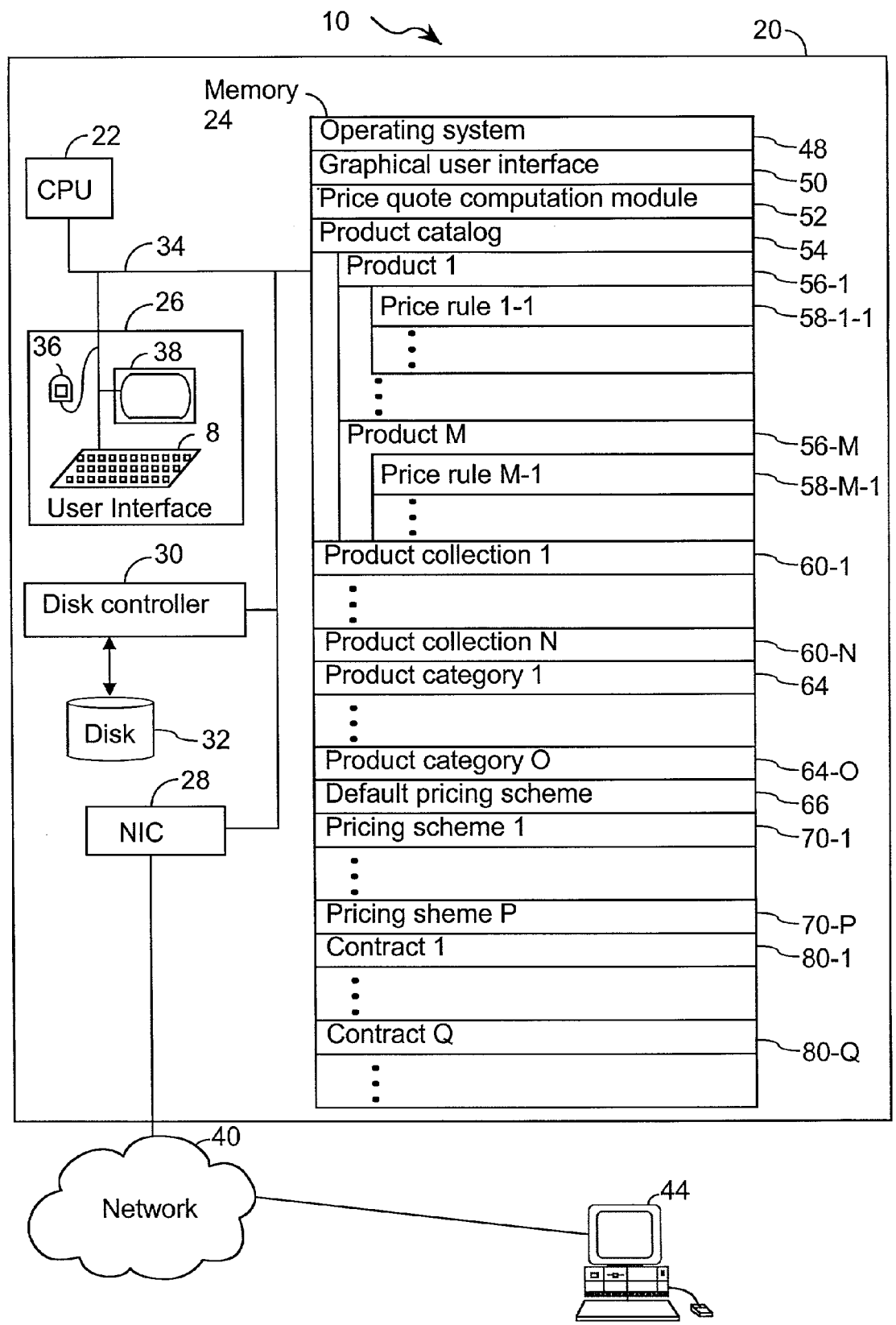
FIG. 1 illustrates a system that is operated in accordance with an embodiment of the invention.

FIG. 1 illustrates a system 10 that is operated in accordance with one embodiment of the invention. System 10 includes one or more client computers 44 and at least one server 20. Client computers 44 and server 20 are connected by a communications network 40. Communications network 40 is a local area network (LAN), wide area network (WAN), metropolitan area network (MAN), an Intranet, the Internet, or any combination of such networks.

Server 20 includes standard server components including a central processing unit 22, high speed random access memory 24 for storing program modules and data structures, user input/output device 26, a network interface 28 for coupling server 20 to other computers via communication network 40, a disk controller 30 for controlling non-volatile storage 32, and one or more busses 34 that interconnect these components. User input/output device 26 includes one or more user input/output components such as a mouse 36, display 38, and keyboard 8.

Random access memory 24 includes a number of modules and data structures that are used in accordance with the present invention. However, it will be appreciated that a portion of any of the modules and/or data structures stored in random access memory 24 may, in fact, be stored in non-volatile form on non-volatile storage 32. In a typical embodiment, memory 24 includes an operating system 48. Operating system 48 includes procedures for handling various basic system services and for performing hardware dependent tasks.

Memory 24 also includes a graphical user interface 50. Graphical user interface 50 works in conjunction with network 40 and clients 44 to provide a mechanism that is used to communicate price quotes to customers, field service representatives, sales staff, or others. In addition, graphical user interface 50 provides a mechanism that allows vendors to define groups of products, such as product categories or product collections, as well as to define price rules that affect such groups. In one embodiment of the present invention, graphical user interface 50 includes one or more web pages that may be viewed on a client 44 using a web browser such as Internet Explorer (Microsoft, Redmond, Wash.).

Memory 24 further includes a price quote computation module 52 that is used to prepare price quotes. In some embodiments of the present invention, module 52 is a component of graphical user interface 50. In other embodiments, module 52 is an independent standalone program. Price quote computation module 52 prepares price quotes for products by resolving the complex set of price rules that are applicable to the products.

One or more product catalogs 54 are also stored in memory 24. Each product catalog 54 includes a plurality of products 56. A product can be goods, services, or any combination of goods and services. One or more price rules 58 may be uniquely attached to any given product 56 in product catalog 54. These unique price rules 58 may, for example, designate a cost price, list price, or discount price for the product. In another example, the price rules 58 describe a matrix that includes the price for the product as a function of quantity of a product requested.

Memory 24 further stores one or more product collections 60. A product collection 60 is a dynamic grouping mechanism that allows a vendor to group products 56 based on one or more dynamic criteria, such as "top selling items." Memory 24 additionally stores product categories 64. Product categories 64 are distinguishable from product collections 60 in the sense that product categories 64 are statically defined whereas product collections 60 are determined, at least in part, based on one or more dynamic criteria. The dynamic criteria used to define a product collection 60 may include conditions such as time of day, relative sales volumes, inventory levels and the like into selection rules. Therefore, the composition of a product collection 60 may change on a dynamic basis in accordance with selection rules associated with the product collection 60. It is possible for a product 56 to be in more than one product category 64 or product collection 60.

One or more pricing schemes 70 are also stored in memory 24. Pricing schemes 70 aid in the determination of which price rules are applicable to a given product 56, product collection 60 and/or product category 64. Each pricing scheme 70 includes special rules that determine which price rules are applicable to a particular product 56. In some embodiments of the present invention, there is a default pricing scheme 66 that is used when no other pricing scheme has been explicitly defined for one or more products 56 in a product quote. In addition, there are any number of pricing schemes 70 that are customized for specific transactions or classes of transactions.

One embodiment of the present invention uses contracts 80 that are stored in memory 24. Contracts 80 are used to specify customers. More specifically, each contract 80 specifies a customer, a time period, and a product scope designation. The product scope designation of a contract 80 describes which of the products 56, product collections 60 and/or product categories 64 in product catalog 54 are covered by the contract 80. Optionally, a contract 80 may specify a pricing scheme 70 that governs the pricing of product collections 60, product categories 64, and/or individual products 56 that are covered by the contract 80. To generate a quote for a customer, the appropriate contract 80 encompassing the customer, the time period, and the products 56 for which a quote is needed are first identified. A procedure call is then made to obtain the appropriate pricing scheme 70. To this end, the appropriate pricing scheme is either the pricing scheme 70 that is optionally designated by the contract 80 or it is the default pricing scheme 66.

Figure 2:
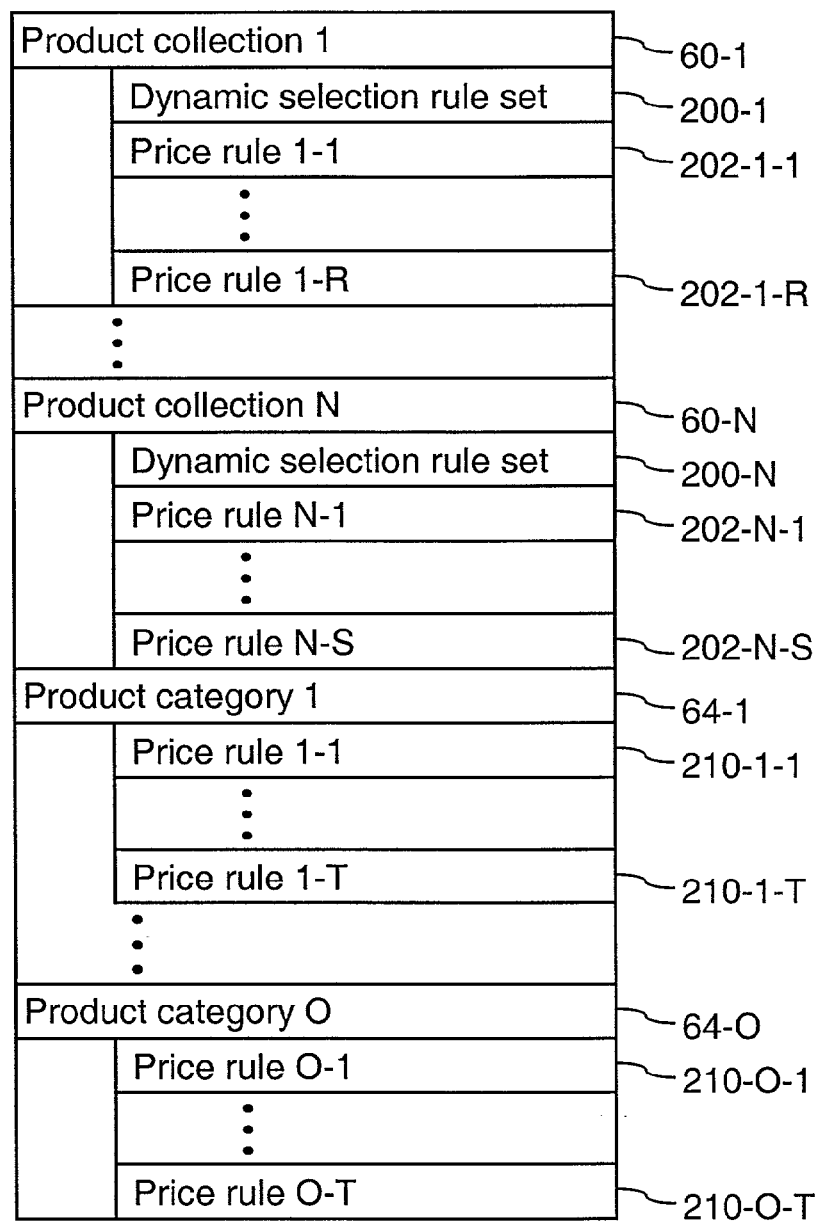
FIG. 2 illustrates the data structure for product collections and product categories, in accordance with one embodiment of the present invention.

FIG. 2 discloses a more detailed view of product collections 60 and product categories 64 in accordance with one aspect of the invention. Each product collection 60 includes a corresponding dynamic selection rule set 200 that defines which of the products, selected from among all products in product catalog 54 (FIG. 1), are included in the corresponding product collection 60. In addition, each product collection 60 includes one or more price rules 202 that apply to all the products that are included in the collection. Each product category 64 is statically defined as a subset of the products 56 in product catalogue 54. Each product category 64 includes one or more price rules 210 that apply to each product in the catalogue. A product collection 60 can include other product collections 60, and a product category 64 can include other product categories 64. As a result, a product 56 may belong not only to multiple product categories 64 and product collections 60, but also to product collections 60 and product categories 64 at multiple hierarchy levels in a product hierarchy.

FIG. 3 discloses a more detailed view of pricing schemes 70 in accordance with one aspect of the invention. Each pricing scheme 70 includes one or more resolution principles 302. In one embodiment of the present invention, there are four types of resolution principles 302 used in pricing schemes 70 to help resolve which price rules apply to a given product 56. In this embodiment, the resolution principles are Inheritance principles, Assertion principles, Connectivity principles, and Arbitration principles. The resolution principles 302, whose functions are described next, are better understood when one considers that price rules are associated with products 56 (price rules 58; FIG. 1), product collections 60 (price rules 202; FIG. 2), or product categories 64 (price rules 210; FIG. 2) and that each price rule (58, 202, or 210) has a price rule type and that each price rule belongs to a specific product 56 (price rules 58), product collection 60 (price rules 202) or product category 64 (price rules 210).

Inheritance principles are used to decrease the number of possible price rules that apply to a product 56. In a default setting, when a price quote is requested for a product 56, price rules are potentially searched for in several different areas in order to identify all price rules 58 that apply to the product 56. For instance, for any given product 56, there may be price rules 58 that uniquely apply to the product. In addition, the product 56 may be a member of one or more product collections 60 having price rules 202 that apply to the product 56. Further still, the product may belong to one or more product categories having price rules 210 that apply to the product. Inheritance principles are used to decrease the number of possible price rules that apply to a product by excluding price rules in specified objects. Thus, inheritance principles can be used to ignore price rules 58, 202, and/or 210.

Inheritance principles take advantage of the fact that all price rules (58, 202, and 210) have a price rule type. Each inheritance principle designates a price rule type and the objects that may be searched for price rules of the designated price rule type. In one embodiment, an inheritance principle has the syntax:

inherit [<price rule type>]<inheritance list> where,

<price rule type> is a specific price rule type, and

<inheritance list> is a list of one or more items, each of which is selected from among the following:

| | |
|---|---|
| SKU: | search for price rules associated with a specific product 54 |
| all products: | search for price rules associated with any product 54 |
| product category: | search for price rule associated with any product category 64 |
| product category = "name": | search for price rules associated with specific product category 64 |
| product collection: | search for price rules associated with any product collection 60 |
| product collection = "name": | search for price rules associated with a specific product collection 60 |

In addition to searching among specific products 56, product categories, and product collections, inheritance principles may be used to search among "all products." When "all products" is specified, all price rules 58 in memory 24 are searched. For convenience, products 56, product categories 64, product collections 60, and the "all products" designation are collectively referred to as objects. An exemplary inheritance principle is:

inherit Promos category="Summer Catalog", SKU, product collection

This Inheritance principle instructs for the query of three objects for price rules of type "Promos." First, the product category 64 named "Summer Catalog" is searched for associated price rules of type "Promos." In one embodiment, if a price rule of type "Promos" is associated with the product category "Summer Catalog," the search for price rules of type "Promos" terminates and the objects "SKU" and "collection" are not queried. However, if a price rule of type "Promos" is not identified in the product category "Summery Catalog," a query for price rules of type "Promos" that are associated with the specific product having the identified SKU number "SKU" is performed. SKU stands for Stock Keeping Unit and is a number associated with a product for inventory purposes. Finally, if a price rule of type "Promos" still has not been found, all product collection 60 (FIG. 1, FIG. 2) price rules are queried for price rules of type "Promos." In this way, Inheritance principles are used to control the objects that are searched for price rules of specific price rule types.

Assertion principles define which price rules to ignore when a specific rule or rule type has been applied. Assertion principles are used, for example, to avoid combining multiple discounts or to override one discount with another. Assertion principles implement conditional statements. Accordingly, assertion principles have the syntax:

If type <list 1> then ignore <list 2> or
ignore all in <list 1> except <list 2> where,
list 1 is any valid set of price rules or price rule types; and
list 2 is any valid set of price rules or price rule types.

List 1 and list 2 each include, for example, price rules associated with one or more designated product collections 60, product categories 64 or products 56. List 1 and list 2 also include designated price rule types. Thus, a first exemplary assertion principle is:

if type promotion then ignore types default

In this first example of an assertion principle, list 1 is all price rules of type "promotion." The assertion principle states that if a price rule having the price rule type "promotion" is found, then all price rules having a price rule type of "default" are to be ignored. A second exemplary assertion principle is:

ignore all except rules PR1, PR2

In this second example of an assertion principle, list 1 is all price rules. The assertion principle states that all price rules except price rules PR1 and PR2 are to be ignored when computing the price for a given product.

Arbitration rules define the value to use when several price rules are applicable to a particular product 56, resulting in the generation of one price and one "price type" associated with it. This value may be, for example, the maximum or minimum price. Thus, an arbitration rules takes as input a set of price rules, where each price rule is a different price rule type. The arbitration rule provides as output one of the input price rule. The price rule that is provided as output is selected from among each of the input price rules based on the specified arbitration principle. Arbitration principles have the syntax:

arbitrate using <min max> price

An example of an arbitration principle is:

arbitrate using minimum price

Connectivity principles are used to define the interaction between multiple price rules having the same price rule type that apply to a given product 56. Connectivity principles allow for the combination or prioritization of such price rules. In particular, connectively principles specify how to combine two or more price rules that each specify a percentage price adjustment (connect percentage), how to combine two or more price rules that each specify an amount price adjustment (connect amount), or how to combine price rules specifying amount price adjustments with price rules specifying percentage price adjustments (connect join). Because of the flexibility of connectivity principles, the syntax for connection principles is more complex:

```
<connection>                  :=  connect price rule type <connection expression>
<connection expression>       :=  <connect percentages>
                                  <connect amount>
                                  <connect join>
<connect percentages>         :=  <connect percentages combiner> percentages
<connect percentages combiner>
                              :=  cascade
                                  average
                                  maximum
                                  minimum
                                  sum
<connect amount>              :=  <connect amounts combiner> amounts
<connect amounts combiner>
                              :=  maximum
                                  minimum
                                  sum
<connect join>                :=  <connect join combiner><connection join parts>
<connection join parts>       :=  amount then percentage
                                  percentage then amount
<connection join combiner>    :=  cascade
                                  maximum
                                  minimum
                                  sum
```

An example of a Connectivity principle is the following:

Connect CostPrice cascade percentages

This Connectivity principle multiplies the percentage adjustments of all price rules of price rule type "CostPrice." In another example, the connectivity principle:

Connect CostPrice cascade amount then percentage applies the price rules of price rule type CostPrice that have an amount price adjustment and then applies the price rules of price rule type CostPrice that have a percent adjustment. For instance, if there are two price rules of price rule type CostPrice as follows:

price rule 1 (type CostPrice): deduct $3.00 and
price rule 2 (type CostPrice): deduct 5 percent, then the Connection principle will apply the $3.00 deduction and then the 5 percent reduction. The term "cascade" in the above example indicates that if there are multiple percentage adjustments of the specified price rule type, then those percentage adjustments are multiplied to determine the percentage adjustment to be applied to the price being computed. If the Connection principle had the term "minimum" rather than "cascade" the price adjustment that yields the smallest price is selected.

FIG. 3 further discloses a more detailed view of contracts 80 in accordance with one aspect of the invention. Each contract 80 specifies a customer 304 and a time period 306 for which the contract is valid. A customer may be, for example, a corporation, a division within the corporation, or an individual. Each customer may be represented by one or more contracts 80. Multiple contracts 80 may be used, for instance, to cover different time periods, different sets of products 56, or other characteristics relating to a single customer. Each contract 80, nevertheless, is applicable to only one customer.

Each contract 80 has a price rule set 308 that includes hard price rules 310 as well as soft price rules 312. Each hard price rule 310 comprises a price rule expression and a price rule type. The price rule expression designates a pricing operation such as applying a percent discount, applying an amount discount or specifying a price. The price rule type is a user-defined term that is used to classify each hard price rule. Several hard price rule 310 may have the same price rule type. For example, there may be hard price rules 310 having a price rule type of class "List_Price" and of class "Cost_Price." Each soft price rule 312 describes a price rule type. Soft price rules 312 are used to collect price rules having the designated price rule types from applicable products, product collections, and product categories.

Each contract 80 further includes a product scope designation 314 that determines a subset of products 56 in the product catalog 54 to which the contract is applicable. Furthermore, contracts 80 optionally include a pricing scheme designation 316 that designates a pricing scheme 70 that is used to resolve price rules specified by a contract 80 price rule set 308.

Figure 4:
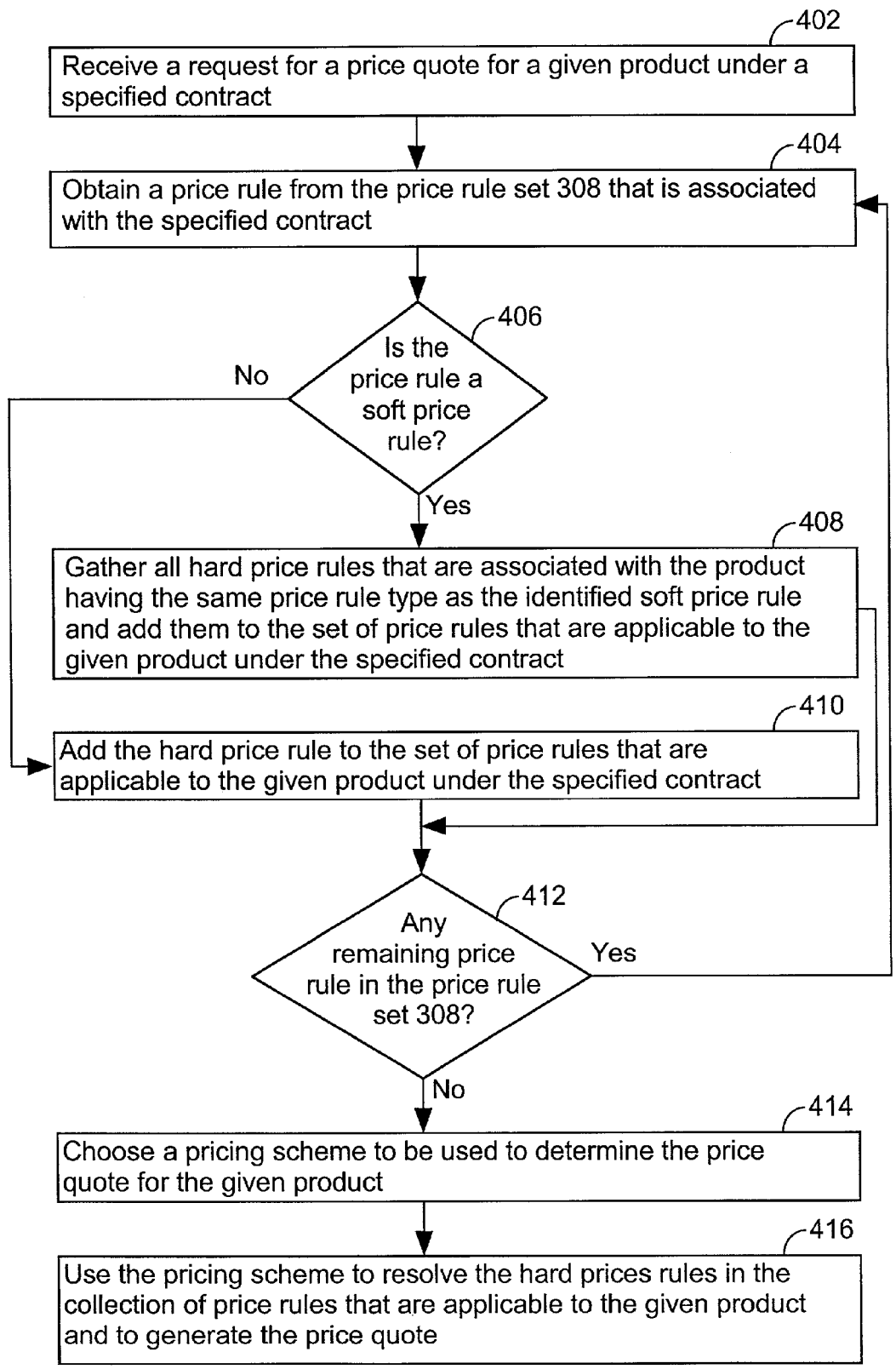
FIG. 4 illustrates the processing steps that are used to generate a price quote for a product using a contract, in accordance with one embodiment of the present invention.

FIG. 4 illustrates how a contract may advantageously be used in one embodiment of price quote computation module 52 (FIG. 1) in accordance with the present invention. In processing step 402, a request for a price quote under a specified contract 80 is received. The request may be received using graphical user interface 50 (FIG. 1), batch processing, or some other means. After receiving the request for a price quote, processing steps 404 through 412 are repeatedly executed until each price rule in the price rule set 308 associated with the specified contract 80 has been processed.

In processing step 404 a price rule from the price rule set 308 that is associated with the contract specified in processing step 402 is obtained. If the price rule is a soft price rule 312 (FIG. 3) (406-Yes), control passes to processing step 408. In processing step 408, all hard price rules that are associated with the given product 56 for which a price quote is requested and that have the same price rule type as the soft price rule identified in processing step 404 are added to a collection of price rules applicable to the given product for which a quote has been requested. There are many different potential locations where hard price rules that are associated with the given product 56 may be found. A first source of such hard price rules is the price rules 58 (FIG. 1) that uniquely apply to the given product 56. A second source of such hard price rules are the price rules 202 (FIG. 2) of each product collection 60 in which the given product 56 is a member. A third source of such hard price rules is the price rules 210 (FIG. 2) of each product category 64 in which the given product 56 is a member.

If the price rule identified in the last instance of processing step 404 is, in fact, a hard price rule 310 (FIG. 3) (406-No), control passes to processing step 410 (FIG. 4) where the hard price rule is added to the set of price rules that are applicable to the given product 54 for which a quote has been requested. In processing step 412, the question is asked whether there are any remaining price rules in the price rule set 308 that is associated with the applicable contract 80. If so (412-Yes), process control passes back to processing step 404 where another price rule is obtained from the price rule set and evaluated by processing steps 406 through 410 (FIG. 4). If no processing steps remain in the price rule set 308 (412-No), then control passes to processing step 414.

In processing step 414, a pricing scheme is chosen. The pricing scheme is used to resolve each of the price rules that have been collected in preceding processing steps. In some contracts 80, a designated pricing scheme field 316 designates a particular pricing scheme 70 that is be used to resolve the price rules (FIG. 3). In some other contracts 80, no pricing scheme is explicitly defined. In such instances, a system-wide pricing scheme 66 is used to resolve the price rules that have been collected in preceding processing steps. In processing step 416, the pricing scheme (66 or 70) that was chosen in processing step 414 is used to resolve the price rules in the collection of price rules that was collected in the preceding processing steps in order to generate the price quote for the given product 56.

In one embodiment of the present invention in which contracts 80 are used, a price quote for a given product is computed using the contract 80. The contract specifies a price rule set 308 for a plurality of products defined by the contract product scope designator field 314 (FIG. 3). The given product is a member of the plurality of products. To compute the price quote, the price rule set 308 for the plurality of products associated with the contract is identified. Each price rule in the price rule set 308 is either a hard price rule (310) or a soft price rule (312). Each hard price rule 310 comprises a price rule expression and a price rule type. Each soft price rule 312 comprises a price rule type. A collection of price rules is generated. The collection of price rules includes, for each soft price rule in the price rule set 308, hard price rules that are associated with the product and have the same price rule type as the soft price rule 312. The collection further includes the hard price rules 310 in the price rule set 308. To determine the price quote for the given product 56, a pricing scheme is chosen. The pricing scheme may be a system-wide default pricing scheme 66 (FIG. 1) or a customized pricing scheme 70 (FIGS. 1, 3). The pricing scheme is used to resolve each of the hard price rules in the collection of price rules in order to determine the price quote. In some embodiments the pricing scheme is used to filter each of the hard price rules in the collection of price rules using one or more resolution principles specified by the pricing scheme in order to derive a final set of applicable price rules.

Contracts 80 are advantageous because they provide a way to track the discounts that apply to a particular customer during a specified time period. However, there may be additional price rules that apply to products. For example, salespeople may have the privilege to provide discounts, the vendor may be running specials on overstocked or discontinued items, etc. Thus, there may be situations in which multiple discounts apply to a particular product. To assist in determining which price rules trump other price rules, which price rules are to be ignored, and how price rules are to be combined, the present invention provides two additional layers of control in addition to contracts. First, each price rule 58 (FIG. 1), 202 (FIG. 2), 210 (FIG. 2), 310 (FIG. 3) and 312 (FIG. 3) has a price rule type. Thus, as seen in the case of soft price rules 312 in contracts 80, whole groups of price rules can be processed using a single command that designates a price rule type rather than a specific price rule.

Second, as previously disclosed, the present invention provides pricing schemes 70 that resolve price rules in order to achieve a price quote in accordance with an overall pricing strategy. Price schemes can be used, for example, to avoid the application of an excessive number of discounts to a given product.

Figure 5:
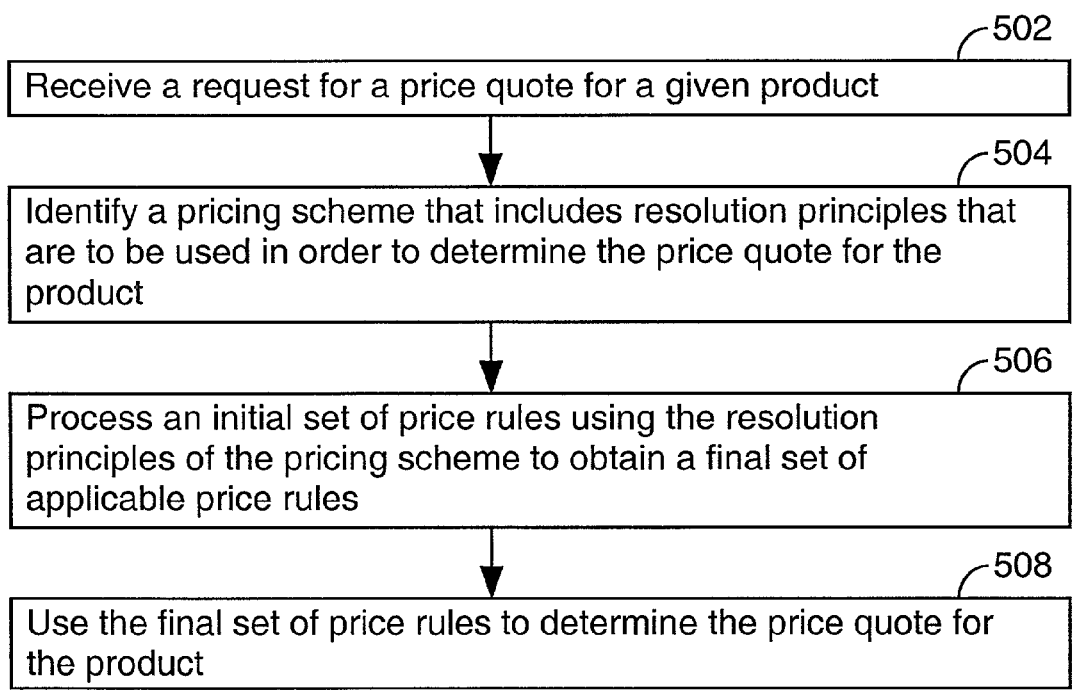
FIG. 5 illustrates generalized processing steps used to create a price quote for a product using a pricing scheme.

FIG. 5 illustrates generalized processing steps used to create a price quote for a given product using a pricing scheme. In processing step 502 a request for a price quote for a given product is received. Next, in processing step 504, a pricing scheme 66 or 70 (FIG. 1) that includes resolution principles 302 (FIG. 3) that are to be used in order to determine the price quote for the product is identified. The pricing scheme may be a system-wide default pricing scheme 66 or a transaction-specific pricing scheme 70. In processing step 506, an initial set of price rules is processed using the resolution principles 302 of the pricing scheme identified in processing step 504. This results in the generation of a final set of applicable price rules that is then used in processing step 508 to determine the price quote for the product.

The processing steps of FIG. 5 provide an overview of how pricing schemes are used to determine the price quote for a given product. However, there are many different ways in which pricing schemes may be used in accordance with the present invention. The different methods may generally be characterized by two scenarios. In the first scenario, the system is queried for any price rule that is applicable to a product. Price rules identified by this query are placed in the initial set of price rules. Such price rules may be uniquely attached to the given product, they may be associated with a product collection or product category that is applicable to the given product or they may be found in a contract that is used to determine the price quote. Then, the pricing scheme is used to filter the initial set of price rules to identify a final set of price rules that is used to determine the price quote. This first scenario will be described in more detail in conjunction with FIG. 6. In the second scenario, price rules are selectively gathered to form the initial set of price rules in accordance with the pricing scheme in a manner specified by one or more resolution principles in the identified pricing scheme. Then, the initial set of price rules is processed to form a final set of price rules in accordance with one or more resolution principles in the pricing scheme in order to obtain a final set of price rules. This final set of price rules is then used to determine the price quote for the product. The second scenario will be described in more detail in conjunction with FIG. 7.

Figure 6:
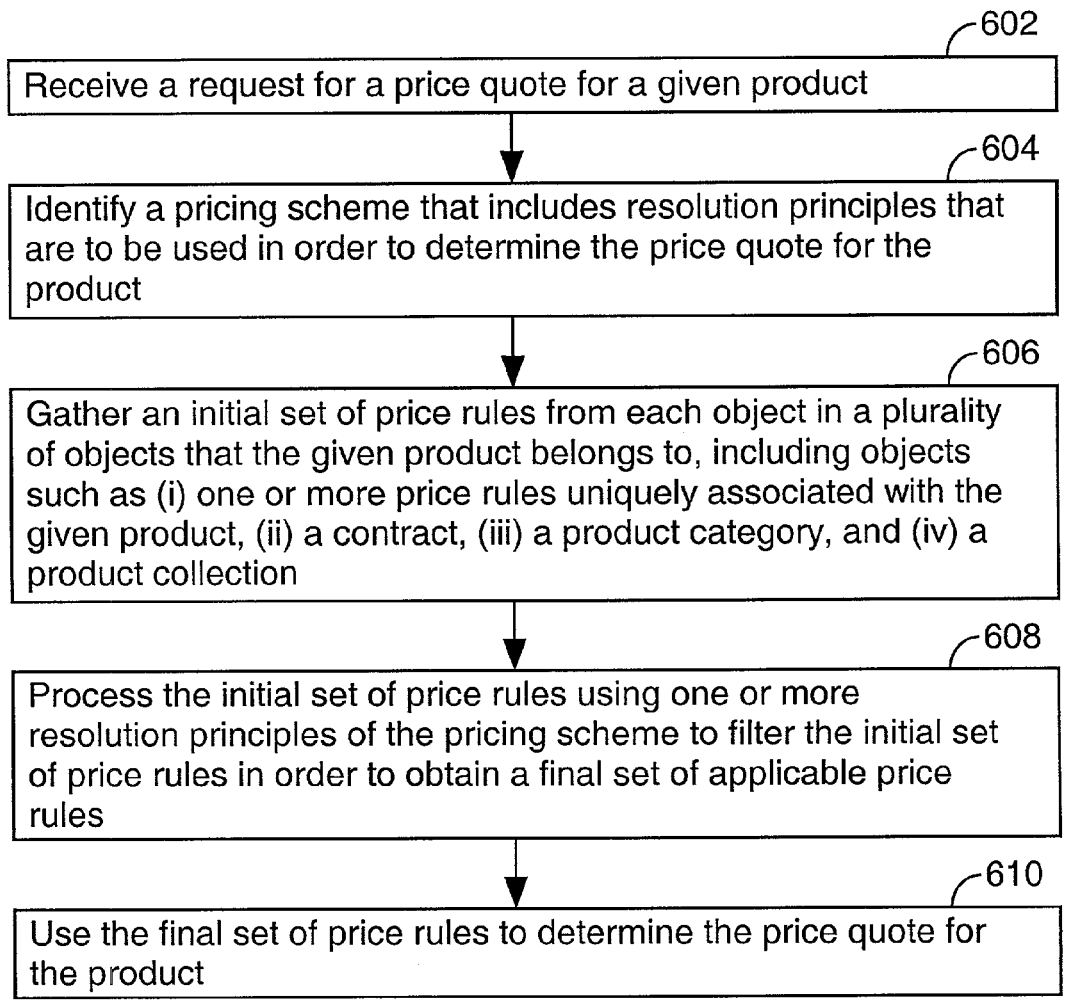
FIG. 6. illustrates processing steps used to create a price quote for a product using a pricing scheme, in accordance with one embodiment of the present invention.

In FIG. 6, a request for a price quote for a given product is received (602). A pricing scheme that includes resolution principles that are to be used in order to determine the price quote for the given product is identified (604). Then, in step 606, price rules that are applicable to the given product are gathered from each object in a plurality of objects that the given product belongs. Such objects include one or more price rules 58 that are uniquely associated with the given product, an applicable contract 80, one or more applicable product categories 64, and/or one or more product collections 60.

The initial set of price rules is processed in step 608 using one or more resolution principles 302 of the pricing scheme identified in step 604 in order to determine a final set of applicable price rules. In one embodiment, a resolution principle in the pricing scheme is an inheritance principle and processing step 608 includes filtering a first and second price rule in the initial set of price rules in accordance with the inheritance principle so that the final set of price rules excludes the first price rule or the second price rule. In this embodiment, the resolution principle has the syntax:

If Rule 1 Ignore Rule 2

That is, the resolution principle states that if price rule "Rule 1" is found in the initial set of price rules, then price rule "Rule 2" is to be excluded from the final set of price rules even if Rule 2 is in the initial set. In some embodiments, the resolution principle has the syntax:

If List 1 Ignore List 2 where,

List 1 and List 2 are independently selected lists of items, where the items in these lists are selected from items such as one or more price rule types, specific price rules, price rules associated with a product collection, price rules associated with a product category, and/or price rules associated with a contract.

In some embodiments of the present invention, processing step 608 includes the step of determining the object source of a first price rule in the initial set of price rules and the object source of a second price rule in the initial set of price rules. Then, a choice is made between including the first or second price rule in the final set of price rules based on the ordering of these objects in an inheritance principle that is included among the inheritance principles in the pricing scheme identified in processing step 604. For example, if the inheritance principles states inherit "New_Rule" <object A> <object B> and both object A and object B include a price rule of type "New_Rule", then the price rule from object A will be included in the final set and the price rule from object B will be ignored. As used here, an object can be a data structure such as a product collection or product category.

In some embodiments of the present invention, a resolution principle in the pricing scheme is an assertion principle that designates a first group of price rules in the initial set of price rules that is to be excluded from the final set of applicable price rules when the initial set of price rules includes a price rule from a specified second group of price rules. Thus, in step 608, the assertion principle is used to exclude the first set of price rules when any price rule in a second set of price rules is found in the initial set of price rules. The first and second group of price rules may independently comprise (i) price rules having a specified price rule type, (ii) price rules 58 uniquely associated with a product 56 in product catalog 54, (iii) price rules 202 associated with a product collection, (iv) price rules 210 associated with a product category, (v) and/or one or more designated price rules.

In still other embodiments of the invention, the pricing scheme used to process price rules in step 608 includes an inheritance principle and an assertion principle. In such embodiments, the initial set of price rules is filtered to form an intermediate set of price rules based on application of the inheritance principle of the pricing scheme. Then, an assertion principle is applied to the intermediate set of price rules. The assertion principle indicates a first group of price rules to exclude from the final set of price rules when the intermediate group of price rules includes a price rule from a second group of price rules. Thus, application of the assertion principle to the intermediate set of price rules serves to exclude some price rules from the final set of price rules. In alternative embodiments, the order in which an assertion principle and an inheritance principle are applied is reversed. In such embodiments, an assertion principle is used to form an intermediate set of price rules and then the inheritance principle is used to filter the intermediate set of price rules into a final set of price rules. In such embodiments, the assertion principle acts to exclude a first set of price rules from the intermediate set of price rules if the initial set of price rules includes any price rule from a second set of price rules. Regardless of the embodiment, the first and second groups of price rules may independently comprise (i) price rules having a specified price rule type, (ii) price rules 58 uniquely associated with a product 56 in product catalog 54, (iii) price rules 202 associated with a product collection, (iv) price rules 210 associated with a product category, (v) and/or one or more designated price rules.

In additional embodiments of the present invention, the pricing scheme identified in processing step 604 is a connection principle that defines how two or more price rules in the initial set of price rules interact with each other. Processing step 608 applies the two or more price rules in the manner specified by the connection principle. In one example, the two or more price rules are percentage price adjustments and the connection principle dictates selection of the price rule of the two or more price rules that specifies the largest or smallest percentage price adjustment for inclusion in the final set of price rules. The syntax for such connection principles is, respectively:

maximum percentages, and
minimum percentages.

In these embodiments, remaining price rules in the two or more price rules are excluded from the final set of price rules. In another example, the two or more price rules are percentage price adjustments and the connection principle dictates summing the two or more price rules to form a new price rule that is included in the final set of price rules during processing step 608. The syntax of the connection principle in this example is:

sum percentages.

In yet another example, the two or more price rules in the initial set of price rules are percentage price adjustments and the connection principle dictates the order in which the price rules are successively applied to form a new price rule that is include in the final set of price rules. In still another example of embodiments of the present invention in which the pricing scheme includes a connection principle, two or more price rules in the initial set of price rules specify amount price adjustments. The connection principle dictates selection of a price rule, from the two or more price rules, that specifies a largest or smallest amount price adjustment for inclusion in the final set of price rules during processing step 608. All other price rules in the two or more price rules are excluded from the final set of price rules. The syntax for such connection principles is, respectively:

maximum amount, and
minimum amount.

In other examples, two or more price rules in the initial set of price rules specify amount price adjustments and the connection principle dictates that the two or more price rules are to be summed or averaged to form a new price rule that is included in the final set of price rules during step 608.

In further examples of embodiments of the present invention in which the pricing scheme includes a connection principle, the connection principle defines how a first price adjustment and a second price adjustment interact with each other. The first price adjustment is generated by applying a first set of price rules and the second price adjustment is generated by applying a second set of price rules. Each price rule in the first set of price rules specifies a percentage price adjustment and each price rule in the second set of price rules specifies an amount price adjustment. Exemplary interactions between the first price adjustment and the second price adjustment that can be defined by the connection principle include selecting the price adjustment from between the first price adjustment and the second price adjustment that specifies a largest or smallest absolute amount. To make such a selection the percentage price adjustment is converted to an absolute amount and then compared to the amount price adjustment. The syntax for such connection principles is, respectively:

maximum price, and
minimum price.

An additional exemplary interaction between the first price adjustment and the second price adjustment, which can be regulated by a connection principle, includes applying the second price adjustment after the first price adjustment. If the first price adjustment represents amount price adjustment and the second price adjustment represents percentage price adjustments, the interaction of this example has the syntax:

cascade amount then percentage.

Of course, the connection principle may require that the first price adjustment be applied after the second price adjustment to yield:

cascade percentage then amount.

In other examples, a first price rule in the initial set of price rules is a percentage price rule and a second price rule in the initial set of price rules is an amount price rule. Further, a resolution principle of the one or more resolution principles in the pricing scheme is a connection principle. In one instance, the connection principle dictates ignoring the price rule, selected from the first price rule and said second price rule, that yields a larger absolute amount. In another instance, the connection principle dictates ignoring the price rule, selected from the first price rule and the second price rule, that yields a smaller absolute amount. In yet another instance, the connection principle dictates the order in which the first price rule and the second price rule is applied.

In step 610 (FIG. 6) the final set of price rules is used to determine a quote for the given product. In one embodiment of the present invention, a resolution principle in the pricing scheme that is identified in processing step 604 is an arbitration principle. In such instances, step 610 includes applying the final set of price rules to generate a corresponding set of prices for the product. Step 610 further includes selecting a price from the corresponding set of prices that is then used to further the price quote in accordance with the arbitration principle. In one example, the arbitration principle dictates choosing the maximum price from the corresponding set of prices. In another example, the arbitration principle dictates choosing the minimum price form the corresponding set of prices.

Figure 7:
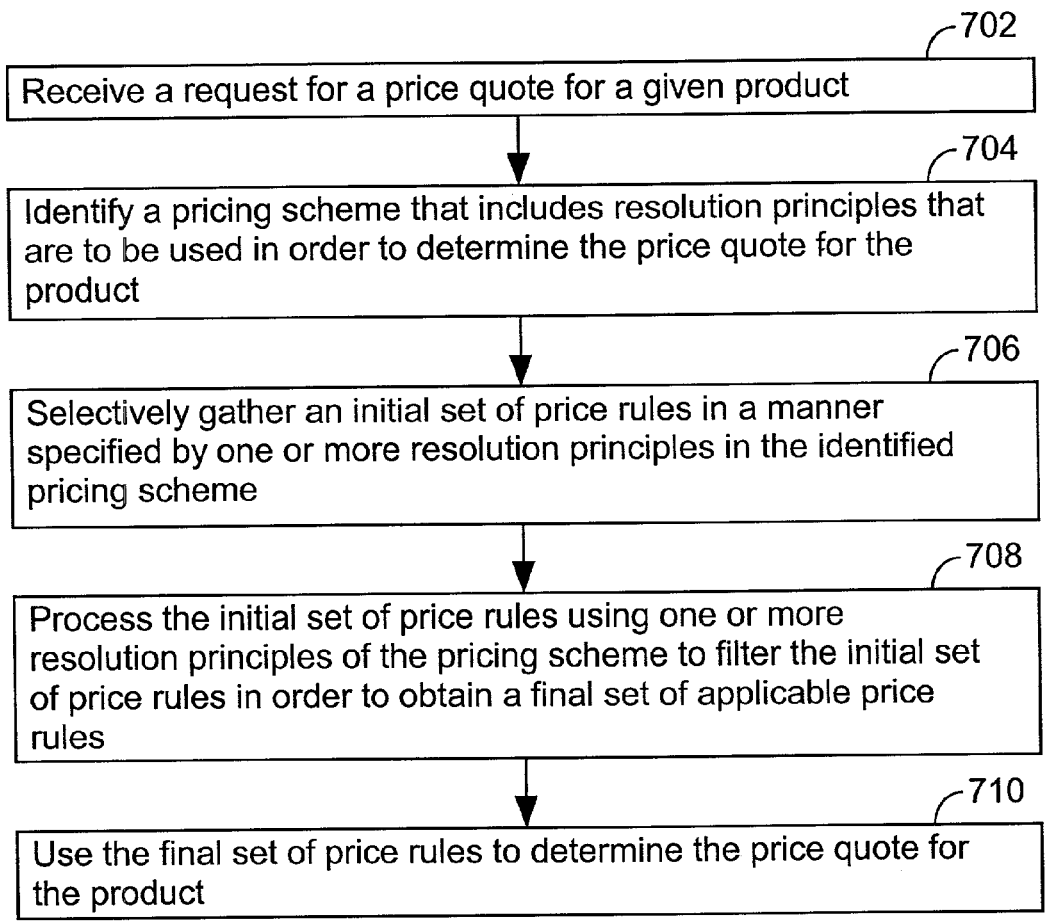
FIG. 7 illustrates processing steps used to create a price quote for a product using a pricing scheme, in accordance with another embodiment of the present invention.

FIG. 7 illustrates processing steps used to create a price quote for a product using a pricing scheme, in accordance with an embodiment of the present invention in which an initial set of price rules is built selectively in accordance with resolution principles of a specified pricing scheme. In processing step 702, a request for a price quote for a given product is received. In processing step 704, a pricing scheme that includes resolution principles that are to be used to in order to determine the price quote for the product is identified. Then, in processing step 706, price rules are selectively gathered from objects in memory 24 (FIG. 1) in order to build an initial set of price rules. The resolution principles of the pricing scheme identified in processing step 704 control the order and the identity of objects in memory 24 that are queried for price rules.

In one embodiment, one or more resolution principles may dictate that objects are to be searched for explicitly defined price rules and/or price rules of a given price rule type. Further, the resolution principles in the pricing scheme identified in step 704 may include one or more inheritance principles that specify the identity and order in which objects in memory are searched for such price rules. For example, one resolution principle in the pricing scheme may be an inheritance principle that states:

inherit Promos product category="SummerCatalog", SKU, product collection

This example defines the manner in which a query executed by processing step 706 gathers price rules. The resolution principle dictates that price rules in step 706 of price rule type "Promos" are to be found by first querying the object product category "SummerCatalog." If a price rule of type "Promos" is not found in SummerCatalog, then the object SKU, which is a product 56 having SKU number "SKU", is to be queried for price rules 58 that are uniquely associated with the product. If price rules of type "Promos" are still not found after this query, than all product collections 60 in memory 24 are to be searched for a price rule of type "Promos" until such a price rule is found.

In some embodiments, the objects that are queried for explicitly defined price rules and/or price rule types include price rules 58 uniquely associated with a specified product 56 or a plurality of specified products 56 (FIG. 1), price rules 308 associated with a contract 80 or a plurality of contracts 80 (FIG. 3), price rules 210 associated with a product category 64 or a plurality of product categories 64 (FIG. 2), and/or price rules 202 associated with a product collection 60 or a plurality of product collections 60 (FIG. 2).

In another embodiment in accordance with FIG. 7, the pricing scheme identified in step 704 may include one or more??>> assertion principles that??>> limit the types of price rules that may be gathered in the initial set of price rules. In such embodiments, step 706 comprises querying at least one object for an associated price rule of a predetermined price rule type in accordance with the assertion principle. Price rules identified in this manner are added to the initial set of price rules unless (i) the price rule is in a first group of price rules that the assertion principle specifies are to be excluded from the initial set of price rules when any price rule in a second group of price rules is associated with one of the objects specified by the assertion principles and (ii) a price rule in a second group of price rules is, in fact, associated with one of the objects specified by the assertion principle. The first group of price rules and the second group of price rules may independently include (i) price rules having a specified price rule type, (ii) price rules uniquely associated with a product selected from among a plurality of products, (iii) price rules associated with a product collection, (iv) price rules associated with a product category, and/or (v) one or more designated price rules.

The initial set of price rules is processed in step 708 (FIG. 7) using one or more resolution principles 302 (e.g., connection principles) of the pricing scheme identified in step 704 in order to determine a final set of applicable price rules. The use of connection principles for this purpose has been described above with reference to step 608 of FIG. 6. In step 710 (FIG. 7) the final set of price rules is used to determine a quote for the given product, as described above with reference to step 610 (FIG. 6).

Figure 8:
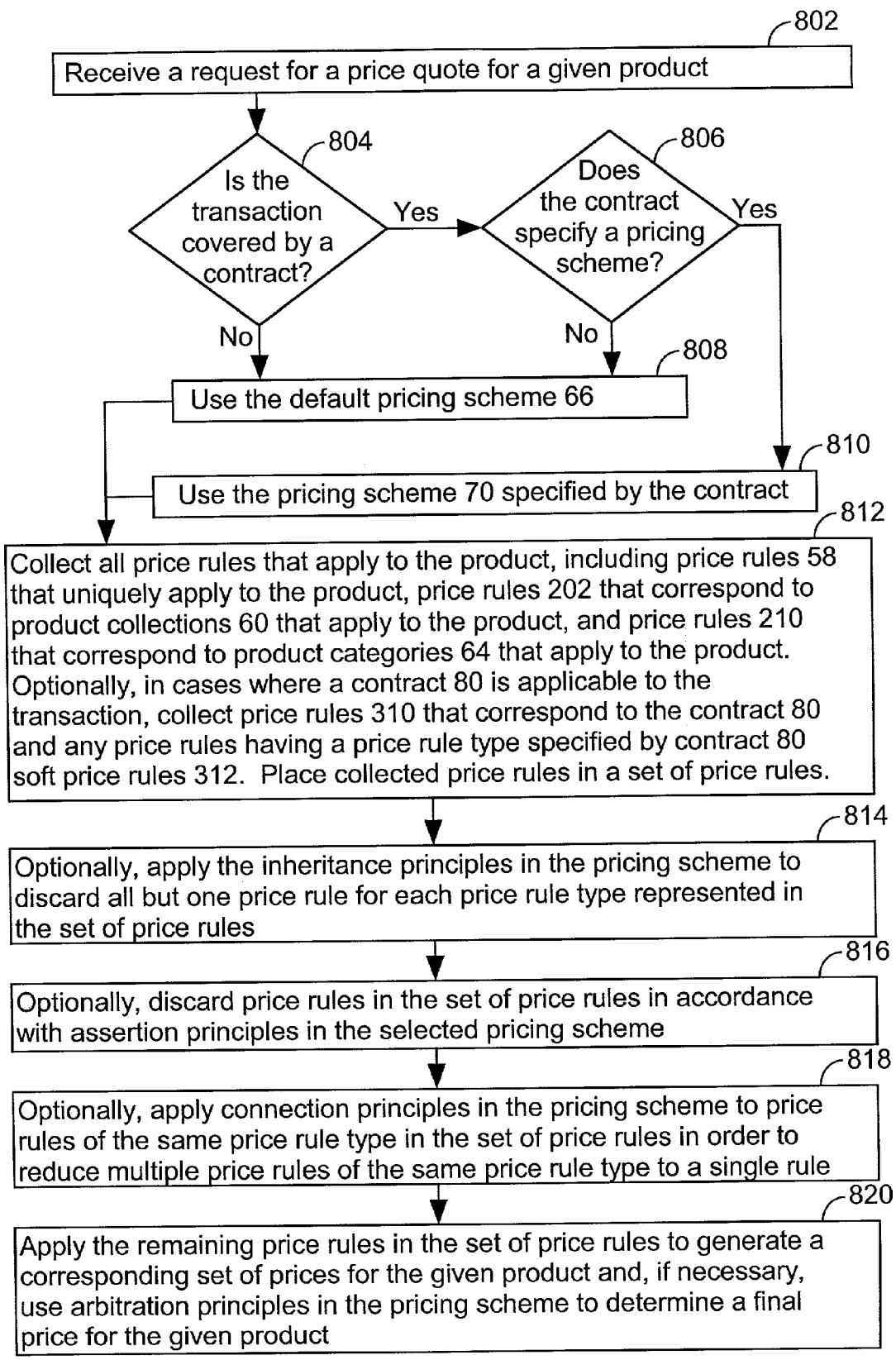
FIG. 8 illustrates processing steps used to compute a price quote for a product using bot a contract and a pricing scheme specified by the contract in accordance with one embodiment of the present invention.

The details of the present invention have now been disclosed. FIG. 8 illustrates one example of the present invention that encompasses many advantageous features of the present invention. In particular, FIG. 8 discloses an embodiment of the present invention in which both a contract and a pricing scheme are used. In processing step 802 a request for a price quote is received. Next, the question is asked (i.e., the price quote determination module 52 determines) whether the transaction is covered by a particular contract 80. In one embodiment, the transaction is always covered by a contract. In this embodiment, when the request for a price quote does not explicitly define a contract, a default contract is used.

When the transaction is covered by a contract (804-Yes) the question is asked whether the contract specifies a pricing scheme. If the designated pricing scheme field 316 of the contract specifies a pricing scheme 70 (FIG. 2) (806-Yes), then that pricing scheme is used (810). If the designated pricing scheme field 316 of the contract does not specify a pricing scheme (806-No), then a default pricing scheme 66 is used (808).

In processing step 812, all price rules that apply to the product designated in the price quote are collected into a set of price rules. There are many sources for such price rules, including the price rules 58 that uniquely apply to the product, the price rules 202 that correspond to product collections 60 that apply to the product, and price rules 210 that correspond to product categories 64 that apply to the product. Optionally, in cases where a contract 80 is applicable to the transaction, the hard price rules 310 (FIG. 3) of the contract are added to the set of price rules. Furthermore, all price rules having the same price rule type as the soft price rules 312 of the contract 80 are also added to the set of price rules.

In processing steps 814 through 820 the resolution principles of the applicable pricing scheme are used to resolve the price rules in the set of price rules gathered in processing step 812. Each transaction does not necessarily require the use of all forms of resolution principles. Accordingly, application of processing steps 814 through 820 is application specific. In the embodiment illustrate in FIG. 8, there are four types of resolution principles, inheritance principles (step 814), assertion principles (step 816), connection principles (step 818), and arbitration principles (step 820).

In optional step 814, inheritance principles in the designated pricing scheme are used to discard all but one price rule for each price rule type represented in the set of price rules gathered during processing step 812. For example, if there are two price rules having the price rule type of "Cost Price" in the set of price rules collected in step 812, an inheritance principle defines which of the two price rules is to be kept and which price rule is to be ignored.

In optional step 816, price rules in the set of price rules are selectively discarded in accordance with one or more assertion principles in the selected pricing scheme. Assertion principles operate by defining first and second groups of price rules. In one embodiment, if the set of price rules gathered in step 812 includes prices rules in a first group of price rules, then price rules in a second group defined by the assertion principle are discarded.

In optional step 818, connection principles in the pricing scheme are used to define how price rules of the same price rule type are combined in order to reduce multiple price rules having the same price rule type down into a single price rule. The connection principle may, for example, specify that the minimum or maximum adjustment specified by a price rule of a given price rule type is to be used and that all other price rules of the same price rule type are discarded.

In step 820 the price quote for a given product is computed. By the time processing step 820 is reached, each remaining price rule in the set of price rules gathered in processing step 812 has a unique price rule type, such as "Cost Price," "List Price," "Bulk Price," or "Discount Price." If there are multiple price rules remaining in the set, then arbitration principles are used to determine which of the price rules will be used as the final price for the designated product. In one embodiment, a set of prices for the product is generated. Each price in the set of prices is generated by a corresponding price rule that remains in the set of price rules gathered in processing step 812 after the set has been processed by steps 814 through 818. Then, the arbitration principle is used to select a price from the set of prices. For example, the connection principle may specify that the maximum price in the set of prices is to be used.

ALTERNATE EMBODIMENTS

The present invention can be implemented as a computer program product that includes a computer program mechanism embedded in a computer readable storage medium. For instance, the computer program product could contain the program modules and data structures shown in FIG. 1. These program modules and data structures may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, wherein said initial set of price rules is constructed by gathering price rules that apply to said product, and wherein a resolution principle of said one or more resolution principles is an inheritance principle, and said initial set of price rules includes a first price rule and a second price rule that are of the same price rule type, and wherein said processing includes filtering said first price rule and said second price rule in accordance with said inheritance principle so that said final set of price rules excludes said first price rule or said second price rule;
   using said final set of price rules to determine said price quote for said product; and
   outputting the price quote for said product via a user interface of the computer system.

2. The method of claim 1, wherein said filtering comprises:
   determining of identify of a first object that said first price rule was gathered from and an identity of a second object that said second price rule was gathered from;
   choosing between said first rule and said second rule based on an ordering of objects specified in said inheritance principle, wherein said first object and said second object are represented in said ordering of objects specified in said inheritance principle; and
   excluding from said final set the price rule that was not chosen.

3. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, and wherein said initial set of price rules includes a price rule that is obtained by querying a plurality of objects for an associated price rule of a predetermined price rule type in accordance with an inheritance principle that is included among said one or more resolution principles; the inheritance rule specifying an order by which said plurality of objects are to be queried for said associated price rule;
   using said final set of price rules to determine said price quote for said product; and
   outputting the price quote for said product via a user interface of the computer system.

4. The method of claim 3, wherein said querying said plurality of objects for an associated price rule is stopped when a price rule of said predetermined price rule type is found.

5. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, and, wherein a resolution principle of said one or more resolution principles is an inheritance principle and said processing further includes obtaining a price rule of a predetermined price rule type for inclusion in said initial set of price rules in accordance with said inheritance principle;
   using said final set of price rules to determine said price quote for said product; and
   outputting the price quote for said product via a user interface of the computer system.

6. The method of claim 5, wherein said obtaining step includes querying, in the order specified by the inheritance principle, at least one object specified by the inheritance principle for an associated price rule of said predetermined price rule type.

7. The method of claim 6, wherein said inheritance principle determines the order by which said at least one object is queried and the querying is stopped when a price rule of said predetermined price rule type is found.

8. The method of claim 6, wherein each object of said at least one object specified by the inheritance principle is independently selected from the group consisting of:
   a price rule uniquely associated with said product,
   a contract,
   a product category, wherein said product category is a set of products that is selected from among said plurality of products based on a predetermined selection rule, and
   a product collection, wherein said product collection is a set of products that is selected from among said plurality of products based on a dynamic selection rule set.

9. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, and wherein a resolution principle of said one or more resolution principles is an assertion principle that requires that a first group of price rules be excluded from said final set of price rules by said processing when said initial set includes a price rule from a specified second group of price rules;
   using said final set of price rules to determine said price quote for said product; and
   outputting the price quote for said product via a graphical user interface of the computer system.

10. The method of claim 9, wherein said first group comprises at least one price rule selected from the group consisting of:
   price rules having a specified price rule type,
   price rules uniquely associated with a product selected from among said plurality of products,
   price rules associated with a product collection, wherein said product collection is selected from among said plurality of products based on a dynamic selection rule set,
   price rules associated with a product category, wherein said product category is a set of products that is selected from among said plurality of products based on a predetermined selection rule; and
   one or more designated price rules.

11. The method of claim 9, wherein said second group comprises at least one price rule selected from the group consisting of:
   price rules having a specified price rule type,
   price rules uniquely associated with a product selected from among said plurality of products,
   price rules associated with a product collection, wherein said product collection is selected from among said plurality of products based on a dynamic selection rule set,
   price rules associated with a product category, wherein said product category is a set of products that is selected from among said plurality of products based on a predetermined selection rule, and
   one or more designated price rules.

12. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, and wherein a resolution principle of said one or more resolution principles is an assertion principle that indicates a price rule that is to be excluded from said final set when said initial set of price rules includes a specified price rule;
   using said final set of price rules to determine said price quote for said product; and
   outputting the price quote for said product via a user interface of the computer system.

13. The method of claim 12, wherein said specific price rule is a specified price rule type.

14. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, and wherein the method further comprising querying at least one object for an associated price rule of a predetermined price rule type in accordance with an assertion principle that is included among said one or more resolution principles, wherein when a price rule of a predetermined price rule type is associated with an object queried by said querying, said price rule is added to said initial set of price rules unless
   (i) said price rule is in a first group of price rules that said assertion principle specifies are to be excluded from said initial set of price rules when any price rule in a second group of price rules is associated with one of said at least one objects, and
   (ii) a price rule in the second group of price rules is associated with one of said at least one objects;
   using said final set of price rules to determine said price quote for said product; and
   outputting the price quote for said product via a user interface of the computer system.

15. The method of claim 14, wherein said first group comprises at least one price rule selected from the group consisting of:
   price rules having a specified price rule type,
   price rules uniquely associated with a product selected from among said plurality of products,
   price rules associated with a product collection, wherein said product collection is selected from among said plurality of products based on a dynamic selection rule set,
   price rules associated with a product category, wherein said product category is a set of products that is selected from among said plurality of products based on a predetermined selection rule, and
   one or more designated price rules.

16. The method of claim 14, wherein said second group comprises at least one price rule selected from the group consisting of:
- price rules having a specified price rule type,
- price rules uniquely associated with a product selected from among said plurality of products,
- price rules associated with a product collection, wherein said product collection is selected from among said plurality of products based on a dynamic selection rule set,
- price rules associated with a product category, wherein said product category is a set of products that is selected from among said plurality of products based on a predetermined selection rule, and
- one or more designated price rules.

17. In a computer system, a method of preparing a price quote for product that is selected from among a plurality of products, the method comprising:
- identifying a pricing scheme to be used in order to determine said price quote for said product, said pricing scheme including one or more resolution principles;
- processing an initial set of price rules in accordance with said one or more resolution principles of said pricing scheme to obtain a final set of applicable price rules, each price rule in said initial set of price rules including a price rule type that includes a price rule identifier, and wherein said one or more resolution principles of said pricing scheme includes an inheritance principle and an assertion principle, and said processing further includes filtering said initial set of price rules to form an intermediate set of price rules based on application of said inheritance principle of said pricing scheme and applying said assertion principle to said intermediate set of price rules, the assertion principle indicating a first group of price rules to exclude from the final set of price rules when the intermediate set of price rules includes a price rule from a second group of price rules;
- using said final set of price rules to determine said price quote for said product; and
- outputting the price quote for said product via a user interface of the computer system.

18. The method of claim 17, wherein said first group comprises at least one price rule selected from the group consisting of:
- price rules having a specified price rule type,
- price rules uniquely associated with a product selected from among said plurality of products,
- price rules associated with a product collection, wherein said product collection is selected from among said plurality of products based on a dynamic selection rule set,
- price rules associated with a product category, wherein said product category is a set of products that is selected from among said plurality of products based on a predetermined selection rule, and
- one or more designated price rules.

19. The method of claim 17, wherein said second group comprises at least one price rule selected from the group consisting of:
- price rules having a specified price rule type,
- price rules uniquely associated with a product selected from among said plurality of products,
- price rules associated with a product collection, wherein said product collection is selected from among said plurality of products based on a dynamic selection rule set,
- price rules associated with a product category, wherein said product category is a set of products that is selected from among said plurality of products based on a predetermined selection rule, and
- one or more designated price rules.

20. In a computer system, a method of preparing a price quote for product that is selected from among a plurality of products, the method comprising:
- identifying a pricing scheme to be used in order to determine said price quote for said product, said pricing scheme including one or more resolution principles;
- processing an initial set of price rules in accordance with said one or more resolution principles of said pricing scheme to obtain a final set of applicable price rules, each price rule in said initial set of price rules including a price rule type that includes a price rule identifier, wherein a resolution principle of said one or more resolution principles is a connection principle, the connection principle defining how two or more price rules in said initial set of price rules interact with each other, and said processing comprises applying said two or more price rules in a manner specified by said connection principle;
- using said final set of price rules to determine said price quote for said product; and
- outputting the price quote for said product via a user interface of the computer system.

21. The method of claim 20, wherein each price rule of said two or more price rules are percentage price adjustments and said connection principle dictates selection of the price rule of said two or more price rules that specifies a largest percentage price adjustment and wherein said connection principle dictates excluding other price rules of said two or more price rules from said final set.

22. The method of claim 20, wherein each price rule of said two or more price rules are percentage price adjustments and said connection principle dictates selection of the price rule of said two or more price rules that specifies a smallest percentage price adjustment and wherein said connection principle dictates excluding other price rules of said two or more price rules from said final set.

23. The method of claim 20, wherein each price rule of said two or more price rules are percentage price adjustments and said connection principle dictates summing said two or more price rules to form a new price rule that is included in said final set.

24. The method of claim 20, wherein each price rule of said two or more price rules are percentage price adjustments and said connection principle dictates and order in which said price rules is successively applied to form a new price rule that is included of said final set.

25. The method of claim 20, wherein each price rule of said two or more price rules are amount price adjustments and said connection principle dictates selection of a price rule from said two or more price rules that specifies a largest amount price adjustment, the connection principle excluding other price rules of the two or more price rules from said final set.

26. The method of claim 20, wherein each price rule of said two or more price rules are amount price adjustments and said connection principle dictates selection of a price rule from said two or more price rules that specifies a smallest amount price adjustment, the connection principle excluding other price rules of the two or more price rules from said final set.

27. The method of claim 20, wherein each price rule of said two or more price rules are amount price adjustments and said connection principle dictates summing said two or price rules to form a new price rule that is included in said final set.

28. The method of claim 20, wherein each price rule of said two or more price rules are amount price adjustments and said connection principle dictates averaging said two or price rules to form a new price rule that is included in said final set.

29. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, wherein a resolution principle of said one or more resolution principles is a connection principle, the connection principle defining how a first price adjustment, generated by applying a first set of price rules, and a second price adjustment, generated by applying a second set of price rules, interact with each other, each price rule in the first set of price rules specifying a percentage price adjustment and each price rule in the second set of price rules specifying an amount price adjustment;
   using said final set of price rules to determine said price quote for said product; and
   outputting the price quote for said product via a user interface of the computer system.

30. The method of claim 29, wherein said connection principle defines an interaction of said first and second price adjustments, the interaction selected from the group consisting of:
   choosing a largest absolute amount,
   choosing a smallest absolute amount,
   applying the second price adjustment after the first price adjustment, and
   applying the first price adjustment after the second price adjustment.

31. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, wherein a resolution principle of said one or more resolution principles is an arbitration principle;
   using said final set of price rules to determine said price quote for said product, said using comprises applying said final set of price rules to generate a corresponding set of prices for said product; and selecting a price from said corresponding set of prices to be used as said price quote in accordance with said arbitration principle; and
   outputting the price quote for said product via a user interface of the computer system.

32. The method of claim 31, wherein said selecting comprises choosing a minimum price from said corresponding set of prices.

33. The method of claim 31, wherein said selecting comprises choosing a maximum price from said corresponding set of prices.

34. In a computer system, a method of preparing a price quote for product that is selected from among a plurality of products, the method comprising:
   identifying a pricing scheme to be used in order to determine said price quote for said product, said pricing scheme including one or more resolution principles;
   processing an initial set of price rules in accordance with said one or more resolution principles of said pricing scheme to obtain a final set of applicable price rules, each price rule in said initial set of price rules including a price rule type that includes a price rule identifier, wherein a resolution principle of said one or more resolution principles is a connection principle, the connection principle defining how a first price and second price rule of said initial set of price rules interact with each other, and wherein the first price rule specifies a percentage price adjustment and the second price rule specifies an amount price adjustment;
   using said final set of price rules to determine said price quote for said product; and
   outputting the price quote for said product via a user interface of the computer system.

35. The method of claim 34, wherein
said connection principle dictates ignoring the price rule, selected from among said first price rule and said second price rule, that yields a larger absolute amount.

36. The method of claim 34, wherein
said connection principle dictates ignoring the price rule, selected from among said first and said second price rule, that yields a smaller absolute amount.

37. The method of claim 34, wherein
said connection principle dictates an order in which said first price rule and said second price rule are applied.

* * * * *